(12) United States Patent
Martens

(10) Patent No.: US 8,365,764 B2
(45) Date of Patent: Feb. 5, 2013

(54) MINIMUM PRESSURE VALVE

(75) Inventor: Kristof Adrien Laura Martens, Grimbergen (BE)

(73) Assignee: Atlas Copco Airpower, Naamloze Vennootschap, Wilrijk (BE)

( * ) Notice: Subject to any disclaimer, the term of this patent is extended or adjusted under 35 U.S.C. 154(b) by 340 days.

(21) Appl. No.: 12/681,685

(22) PCT Filed: Mar. 19, 2009

(86) PCT No.: PCT/BE2009/000017
§ 371 (c)(1),
(2), (4) Date: Apr. 5, 2010

(87) PCT Pub. No.: WO2009/117788
PCT Pub. Date: Oct. 1, 2009

(65) Prior Publication Data
US 2010/0219364 A1 Sep. 2, 2010

(30) Foreign Application Priority Data
Mar. 27, 2008 (BE) .................................. 2008/0186

(51) Int. Cl.
*F16K 21/10* (2006.01)
(52) U.S. Cl. .................. 137/514.5; 137/220; 137/514.7; 137/540
(58) Field of Classification Search ............... 137/514.5, 137/514.7, 536, 540, 854, 219–222
See application file for complete search history.

(56) References Cited

U.S. PATENT DOCUMENTS 2,506,751 A * 5/1950 Trask .............................. 417/550
2,622,792 A * 12/1952 Ramclow ....................... 417/550
(Continued)

FOREIGN PATENT DOCUMENTS

CN 1490545 A 4/2004
EP 1 614 945 A1 1/2006
(Continued)

OTHER PUBLICATIONS

Raw Machine Translation for Chinese Patent Application CN 1490545.*

(Continued)

*Primary Examiner* — Stephen M Hepperle
*Assistant Examiner* — David Colon Morales
(74) *Attorney, Agent, or Firm* — Bacon & Thomas, PLLC

(57) ABSTRACT

Minimum pressure valve having a housing (13) with an inlet (14) and an outlet (15) and in which has been provided a valve body (21) which is pushed against a seating (30) round the inlet (14) in a closed position, and whereby the valve body (21) is situated at a distance from the above-mentioned seating (30) in an open position, such that the inlet (14) is connected to the outlet (15), whereby the valve body (21) is provided in a sliding manner in a valve casing (17) confining, together with the valve body (21) an inner space (36) that is connected to the inlet (14) via a duct (35).

8 Claims, 3 Drawing Sheets

U.S. PATENT DOCUMENTS

| | | | |
|---|---|---|---|
| 2,941,629 A * | 6/1960 | Rohacs | 188/320 |
| 2,943,636 A * | 7/1960 | Reed et al. | 137/220 |
| 3,053,439 A * | 9/1962 | Brill | 418/97 |
| 3,487,852 A * | 1/1970 | Kikendall | 137/514.5 |
| 3,945,393 A * | 3/1976 | Teatini | 137/220 |
| 4,398,559 A | 8/1983 | Bunn et al. | |
| 4,482,303 A * | 11/1984 | Acosta | 417/406 |
| 4,911,196 A * | 3/1990 | Kemp | 137/220 |
| 5,174,327 A * | 12/1992 | Truax et al. | 137/469 |
| 5,871,109 A * | 2/1999 | Litten | 213/43 |
| 6,752,168 B1 * | 6/2004 | Ottestad et al. | 137/220 |
| 2006/0021661 A1 | 2/2006 | Koch et al. | |

FOREIGN PATENT DOCUMENTS

| | | |
|---|---|---|
| GB | 2 295 442 A | 5/1996 |
| JP | 51-12005 | 7/1974 |
| JP | 64-012183 A | 1/1989 |

OTHER PUBLICATIONS

Examination Report of Chinese I.P. Office for CN200980100781.9, May 19, 2011.

International Search Report in PCT/BE2009/000017, Aug. 6, 2009.

Japanese Office Action in corresponding Japanese Application No. 2011-501063, dated Aug. 28, 2012 with English translation.

* cited by examiner

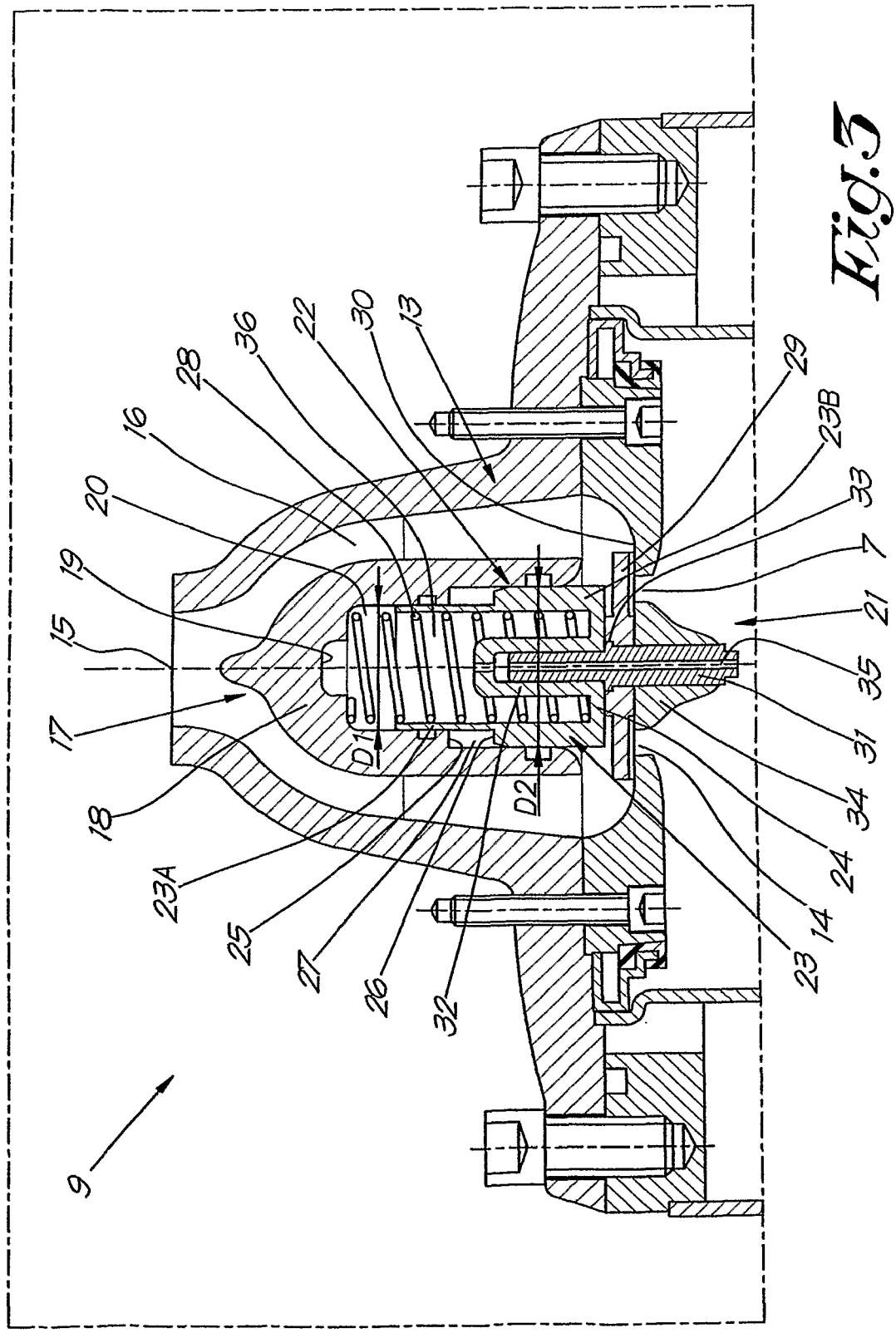

MINIMUM PRESSURE VALVE

FIELD OF THE INVENTION

The present invention concerns a minimum pressure valve, in particular to use at the outlet of a liquid separator of a compressor unit.

BACKGROUND

A minimum pressure valve which can be applied to the outlet of a liquid separator is already known, whereby this minimum pressure valve is provided with a housing with an inlet and an outlet which are connected via an inner duct system and whereby, in the above-mentioned duct system, a movable valve body is provided which is pressed against a seating round the aforesaid inlet in a first, closed position by means of a spring and thereby closes off the inlet; and whereby the valve body is situated at a distance from the above-mentioned seating in a second, open position, such that the inlet, via the duct system, is connected to the outlet.

The presence of the above-mentioned spring makes sure that the minimum pressure valve only opens when a certain minimum pressure has been reached at the inlet of this minimum pressure valve, which inlet may be connected for example to the outlet of a liquid separator.

The reason therefore is that the gas speeds through the liquid separator must be restricted in order to avoid damage to the filter paper and loss of the separation efficiency.

By realizing the above-mentioned spring in the shape of a spring having a specific spring constant and thanks to an appropriate installation of the spring, the opening pressure of the minimum pressure valve can be selected as a function of the application.

Via the inlet, a force is exerted on the valve body by the gas pressure at the inlet, whereas a spring force is exerted in the opposite sense on the other side of the valve body by the above-mentioned spring, which spring force makes sure that the minimum pressure valve remains closed until the vessel pressure has reached a certain value.

A disadvantage of the existing minimum pressure valves is that the spring must be dimensioned such that it is capable of compensating the entire pressure force of the gas at the gas inlet.

Since these pressure values may be relatively large, for example between 4 and 9 bar ($\pm 4.10^5$ to $9.10^5$ Pa) for an oil-injected compressor and even up to 20 bar ($\pm 20.10^5$ Pa) for water-injected compressors, acting on relatively large surfaces, strong springs must be selected.

Moreover, the overall height of the spring must be restricted so as to limit the total height of the minimum pressure valve, and to restrict the material costs and weight.

One must also take into account that the opening range of the minimum pressure valve is small and that, consequently, little extra gas pressure is required to push the valve body entirely open, since the pressure drop over the minimum pressure valve is preferably as small as possible for the entire service range of the compressor (i.e. from minimum operating pressure to maximum operating pressure). In other words, the valve body must reach the entirely open position as fast as possible as soon as the minimum pressure valve begins to open, in order to cause a pressure drop that is as small as possible over the entire pressure range of the compressor.

However, the two above-described conditions are contradictory, since a small overall height for a large required spring force automatically leads to a spring having a large spring constant, which always results in a large difference in spring force between the initial opening and the full opening, such that the minimum pressure valve will only be entirely open at a pressure which is considerably higher than the pressure whereby the valve only just begins to open, such that the pressure drop over the valve is large in the lower part of the service range.

SUMMARY

In order to further reduce the pressure drop over the minimum pressure valve, the aim is to further enlarge the valve opening and to make the valve lift even higher.

A larger valve opening (i.e. larger diameter of the valve body) results in a considerable increase of the required spring force (and consequently a more serious installation problem due to the larger spring constant, and also problems related to a high required pressure for an entirely open minimum pressure valve), whereas a larger lift of the valve body moreover results in an even larger pressure range over which the valve body moves.

The present invention aims to provide a solution to one or several of the above-mentioned and/or other disadvantages.

To this end, the present invention concerns a minimum pressure valve which is provided with a housing with an inlet and an outlet which are connected via an inner duct system and whereby a movable valve body is provided in the above-mentioned duct system which is pressed against a seating round the above-mentioned inlet in a first, closed position by means of a spring and thereby closes off the inlet; and whereby the valve body is situated at a distance from the above-mentioned seating in a second, open position, such that the inlet, via the duct system, is connected to the outlet, whereby said minimum pressure valve is characterised in that the valve body is provided in a sliding manner in a valve casing which is fixed in the above-mentioned duct system and which, together with the valve body, defines a confined, inner space which is connected to the inlet via a duct which may extend for example through the valve body or which may have the shape of an external connection.

An advantage of such a minimum pressure valve according to the invention consists in that, thanks to the presence of the above-mentioned duct which provides for a connection between the confined space inside the valve body and the inlet, the pressure prevailing at the inlet of the minimum pressure valve can enter the space which is defined by the valve casing and the valve body, as a result of which the gas force which acts on the valve body via the inlet will be largely compensated by a gas force acting on the other side of the valve body in the opposite sense.

Consequently, a spring having a considerably smaller spring constant can be selected than is the case with conventional minimum pressure valves, as a result of which the pressure difference between the initial opening position of the valve body and the fully opened position is very small, even if a large opening pressure is required.

This also implies that the lift of the valve body can be selected sufficiently high, without thereby making the pressure range over which the valve body moves excessively large.

The foregoing results in that a very small overall height of the spring can be provided, such that the minimum pressure valve can be made compact.

Moreover, in this manner is obtained that a cheaper spring can be used than with conventional minimum pressure valves, since only a small spring force must be provided for.

Another advantage of a minimum pressure valve according to the invention is that, as a spring with a small spring constant can be used, there is only a restricted pressure range between the initially open position and the fully opened position of the minimum pressure valve.

Another advantage is that the lift of the valve body can be enlarged without having to make the pressure range over which the valve body moves too large, since a spring with a small spring constant can be used.

Another advantage is that the valve opening can be enlarged without having to drastically alter the spring, namely by proportionally enlarging the confined inner space.

Preferably, the above-mentioned valve casing is made in the shape of a cylinder housing defining a cylinder chamber, whereby said cylinder housing is closed on one far end by means of an end wall, and the other far end is open, and in which the valve body, via the open far end, is provided in a sliding manner with a part in the shape of a piston. The above-mentioned piston is preferably made in the shape of a practically cylindrical bush in which the above-mentioned spring extends at least partly and whereby this bush is sealed on one side by means of a bottom wall through which the aforesaid duct extends. This duct can also be provided externally, however.

In this way is obtained a simple construction which can be made compact.

According to another preferred characteristic of the invention, the cylinder chamber in the above-mentioned cylinder housing has a reduced diameter near its closed far end, over a certain length, whereas it has a larger diameter near the open far end of said cylinder housing. Moreover, the above-mentioned bush preferably also has a stepped outer surface over its length, as a first bush part has an outer diameter which practically corresponds to the reduced diameter of the cylinder chamber, and a second bush part has an outer diameter which practically corresponds to the larger diameter of the cylinder chamber.

The wall of the cylinder chamber between the part with the reduced diameter and the part with the larger diameter preferably has a radial collar, and on the outer perimeter of the bush is preferably also provided a radial collar between the first and the second bush part, such that a space is formed which is confined by the part of the valve casing having the larger diameter and the part of the piston having the reduced diameter as well as the respective collars of the bush and the wall, whereby this space is under atmospheric pressure. Consequently, the radial collar of the bush is the only part of the surface of the valve opposite the inlet side (i.e. the side where the spring acts on) where the pressure prevailing on the inlet side is not compensated.

This offers the advantage that it becomes possible to enlarge the diameter of the valve body so as to restrict the pressure drop over the minimum pressure valve without having to make the spring excessively strong, since the surface on which the atmospheric pressure acts (i.e. the collar of the bush between the larger and the reduced diameter) can be kept practically constant and small.

Another advantage thereof is that a minimum pressure valve having a very large opening pressure of for example 20 bar ($\pm 20.10^5$ Pa) can be realised by means of a light spring having a restricted pressure range during the lift of the valve body by making the surface on which the atmospheric pressure acts sufficiently small.

BRIEF DESCRIPTION OF THE DRAWINGS

In order to better explain the characteristics of the present invention, the following preferred characteristics of a minimum pressure valve according to the invention are described by way of example only, without being limitative in any way, with reference to the accompanying drawings, in which:

FIG. 3 shows the part indicated by F3 in FIG. 2 to a larger scale.

DETAILED DESCRIPTION OF EXEMPLARY EMBODIMENTS OF THE DISCLOSURE

Figure 1:
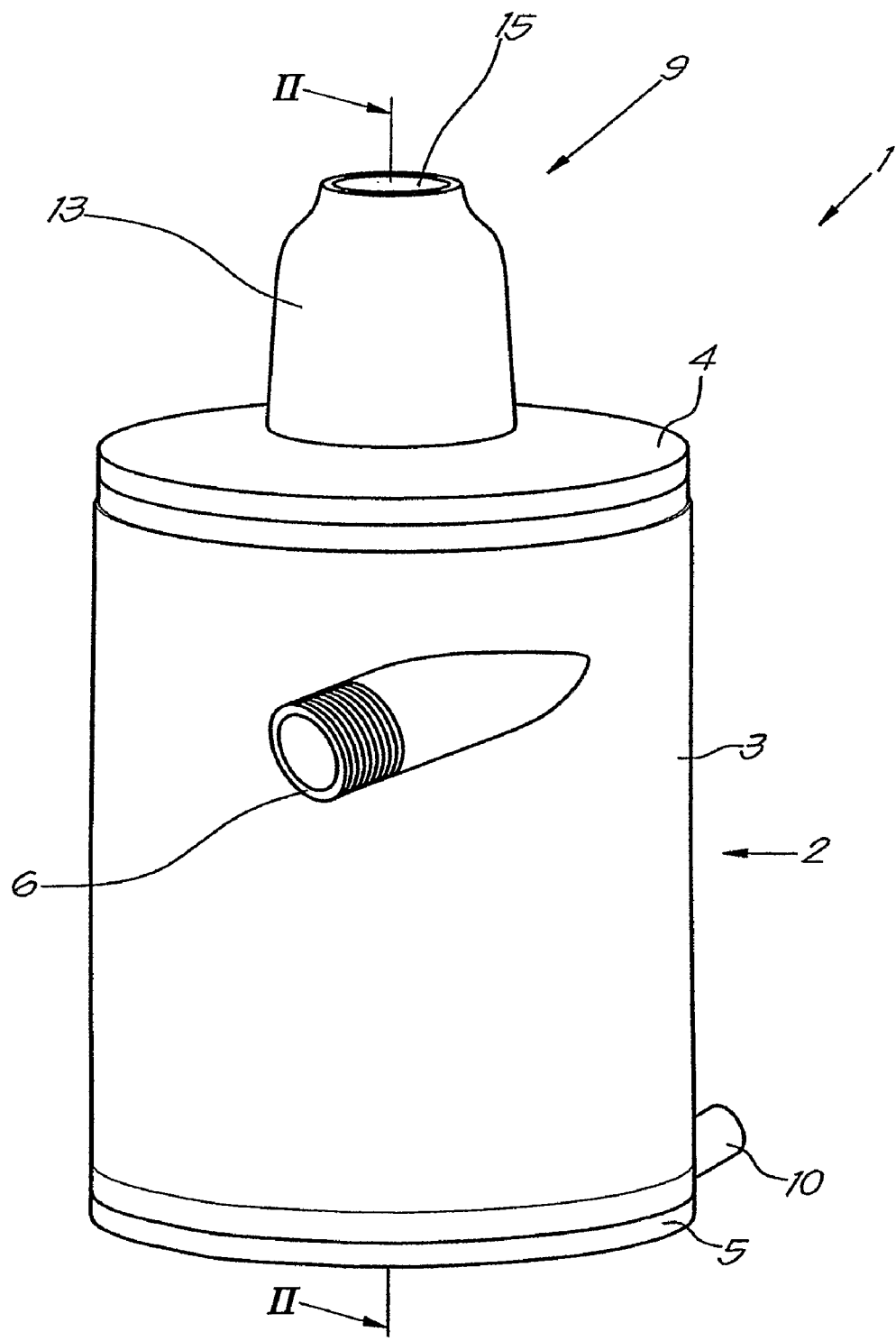
FIG. 1 schematically represents a liquid separator which is provided with a minimum pressure valve according to the invention, seen in perspective.

The figures show a liquid separator 1 which is provided with a centrifugal separator 2 formed of a cylindrical housing 3 with an upper wall 4 and a lower wall 5 and with a tangential inlet 6 and an axial outlet 7, which housing 3 defines an inner space 8.

The above-mentioned outlet 7 is preferably provided centrally in the upper wall of the housing 3 and it is closed by means of a minimum pressure valve 9 according to the invention which forms a connection between the space 8 and a take-off point for purified gas.

The centrifugal separator 2 in this case also comprises a discharge orifice 10 for separated liquid, which discharge orifice 10 is preferably situated at the bottom of the centrifugal separator 2 in the mounted position of the latter, in or near the above-mentioned lower wall 5.

In the above-mentioned space 8 of the centrifugal separator 2 is in this case further provided a flow-through element 11, for example in the form of a coalescence filter or another type of fine filter, or in other words a filter which makes it possible to remove remaining drops of liquid from the gas flow.

In this case, the above-mentioned flow-through element 11 is made cylindrical with walls that are permeable to gas, and said flow-through element 11 is sealed on one side, i.e. the bottom side in the arrangement as represented, by means of a sealing wall 12.

The top side of the above-mentioned flow-through element 11 is fixed to the upper wall 4, and it is positioned such that this flow-through element 11 extends entirely round the above-mentioned outlet 7.

The minimum pressure valve 9 consists of a housing 13 which, in this case but not necessarily, also forms the upper wall 4 of the centrifugal separator 2 and which housing 13 is provided with an inlet 14 and an outlet 15 which are connected via an inner duct system 16.

Inside the duct system 16 is provided a fixed valve casing 17 which is preferably made in the form of a cylinder housing 18 which is sealed on one side by means of an end wall 19 and which is open on the other side, and whereby this cylinder housing 18 defines a cylinder chamber 20 in which has been provided a valve body 21 in a sliding manner, via the open end, by means of a part in the shape of a piston 22.

The above-mentioned piston 22 is preferably made in the shape of a practically cylindrical bush 23 which is sealed on one side, in the given position on the lower side or, in other words, the side opposite the inlet 14, by means of a lower wall 24.

According to a preferred characteristic of the invention, the cylinder chamber 20 in the above-mentioned cylinder housing 18 has a first reduced diameter D1 at its far end which is sealed by the end wall 19, whereas it has a second, larger diameter D2 near the open end of said cylinder housing 18 which is larger than the above-mentioned first, reduced diameter D1.

Also the above-mentioned bush 23 preferably has a stepped outer surface over its length as it comprises a first bush part 23A with an outer diameter which practically corresponds to the reduced diameter D1 of the cylinder chamber 20, and a second bush part 23B with an outer diameter which practically corresponds to the larger diameter D2 of the cylinder chamber 20.

The above-mentioned first bush part 23A extends at least partly in the part of the cylinder chamber 20 with the reduced diameter D1, in the mounted position of the minimum pressure valve 9, whereas the second bush part 23B is provided in the part of the cylinder chamber 20 with the larger diameter D2.

The wall of the cylinder chamber 20 has a radial collar 25 between the part with the first diameter D1 and the part with the second diameter D2, whereas a radial collar 26 is also provided on the outer perimeter of the bush 23 between the first and the second bush part 23A, 23B respectively.

Between the collar 26 of the bush 23, the collar 25 of the wall of the cylinder chamber 20, the part of the cylinder housing 18 having the larger diameter D2 and the first bush part 23A, is formed a confined space 27 which is put under atmospheric pressure, for example by connecting this space 27 to the atmosphere via a small duct, not represented in the figures.

Between the inner wall of the cylinder chamber 20 and the outer wall of the bush 23 are preferably provided one or several sealings, which are not represented in the drawings.

In the above-mentioned bush 23 extends a spring 28 which pushes with one far end against the end wall 19 of the valve casing 17, and with its other end against the lower wall 24 of the bush 23 of the valve body 21.

On the other side of the lower wall 24, in other words the side directed to the inlet 14 of the minimum pressure valve 9, is preferably provided a sealing element 29 which, under the influence of the spring 28, is pushed against a seating 30 round the above-mentioned inlet 14 in a first, closed position and hereby seals the inlet 14, but which, in a second, open position of the minimum pressure valve 9, is situated at a distance from said seating 30, such that the inlet 14, via the duct system 16, is connected to the outlet 15.

The sealing element 29 is in this case connected to the bush 23 by means of a valve stem 31 around which said sealing element 29 extends. This valve stem 31 can be fixed to the above-mentioned bush 23, for example by means of a press fit or the like, or it can be erected in a movable manner in the same axial direction as the piston 22, for example by means of a loose fit, in the above-mentioned bush 23 to thus function as a non-return valve. In this case, the compressed air network of the consumer which is connected to the vessel via the outlet 15, the duct system 16 and the inlet 14, can be kept under pressure, whereas the vessel pressure is blown off and lowered so as to switch the compressor into idle running or to even switch it off entirely.

To this end, the lower wall 24 is in this case provided with a central opening around which extends a cylindrical fixing wall 32 in which the valve stem 31 has been provided in a partly fixed or movable manner. If the valve stem 31 has been erected inside the cylindrical fixing wall 32 in a movable manner, a sealing will preferably be provided between both elements, which is not represented in the figure.

In order to axially lock the sealing element 29 in relation to the valve stem 31, the valve stem 31 is provided with a stop-forming collar 33 against which the sealing element 29 is pressed by means of fixing means provided to that end which in this case comprise a nut 34 which is screwed round the free end of the valve stem 31.

The above-mentioned nut 34 preferably has an aerodynamic shape, in other words a shape which hinders the flow from the centrifugal separator 2 into the duct system 16 as little as possible.

According to the specific characteristic of the invention, a duct 35 extends through the valve body 21 which connects the inlet 14 to a confined, inner space 36 which is defined by the valve body 21 and the valve casing 17. To this end, the duct 35 in this case extends through the valve stem 31, the sealing element 29 and the bush 23. This connection between the inlet 14 and the inner space 36 can also be provided externally, however.

According to a preferred characteristic of the invention, the inlet 14 of the minimum pressure valve 9 has a surface which is slightly larger than the total axially directed surface of the valve body 21 on the side of the valve body 21 turned towards the end wall 19, which is possible in this case as the diameter of the inlet 14 is larger than the above-mentioned first, reduced diameter D1 of the cylinder chamber 20.

In other words, the total, axially directed surface of the lower wall 24 is smaller than the flow-through surface of the inlet 14, whereby by flow-through surface is meant the surface in a plane which is directed crosswise to the direction of movement of the valve body 21.

The working of the liquid separator 1 with the minimum pressure valve 9 according to the invention is very simple and as follows.

A mixture of compressed gas and liquid, such as a mixture of compressed air and drops of liquid coming from a liquid-injected compressor element, enters into the space 8 via the inlet 6.

Thanks to the tangential insertion of the inlet 6 in the cylindrical housing 3, the incoming mixture of gas and liquid is subjected to a whirling motion.

This induces a centrifugal separation, as the relatively heavy liquid particles are swung against the cylindrical wall of the centrifugal separator 2 under the influence of centrifugal forces.

Under the influence of the gravitational force, the separated liquid drips via the cylindrical wall to the lower side of the centrifugal separator 2, where said liquid is discharged via the discharge orifice 10.

After its passage through the flow-through element 11, the purified gas flows through the minimum pressure valve 9 to be taken off by a user.

Thanks to the presence of the duct 35 through the valve body 21, the pressure which is built up in the centrifugal separator 2 and thus at the inlet 14, is also built up in the space 36 between the valve body 21 and the valve casing 17, such that the gas forces acting as of the space 8 on the sealing element 29 are largely compensated by opposite gas forces acting as of the space 36 on the bush 23, and in particular on its lower wall 24.

Moreover, the spring 28 makes sure that, in the given position of the minimum pressure valve 9, an additional downward force is exerted on the valve body 21.

Only the outer stage of the valve body 21, i.e. the space 27, is connected to the atmospheric pressure, such that a difference in compressive force is obtained at the top side of the valve body 21 (downstream) and at the bottom side of the valve body 21 (upstream).

Moreover, in the given example, the surface of the sealing element 29 which is turned towards the inlet 14 is larger than the total axially directed surface of the first bush part 23A situated opposite the end wall 19 of the valve casing 17.

Since a gas force which acts on a surface is proportional to the gas pressure and to the size of the surface concerned, and since the pressure is equal on either side of the valve body 21, the downward directed gas force will be smaller than the upward directed gas force, and the resultant of the operating pressures will be directed upward.

As soon as the pressure in the space 8 has reached a predetermined value, the sealing element 29 will be pushed off the seating 30, as the upward gas forces acting on said sealing element 29 become larger than the sum of the downward directed gas forces and the spring force.

Thanks to the presence of the duct 35, the opening pressure of the minimum pressure valve 9 may have a high pressure value of for example 4 to 9 bar ($\pm 4.10^5$ to $9.10^5$ Pa) or even up to 20 bar ($\pm 20.10^5$ Pa) in the case of water-injected compressors, without any expensive spring with a large spring constant having to be provided.

The foregoing also implies that the opening range of the pressure is considerably smaller than with the existing minimum pressure valves 9 which do not have any compensation of forces in the form of a counterpressure acting on the valve body 21 as of the cylinder chamber 20.

Figure 2:
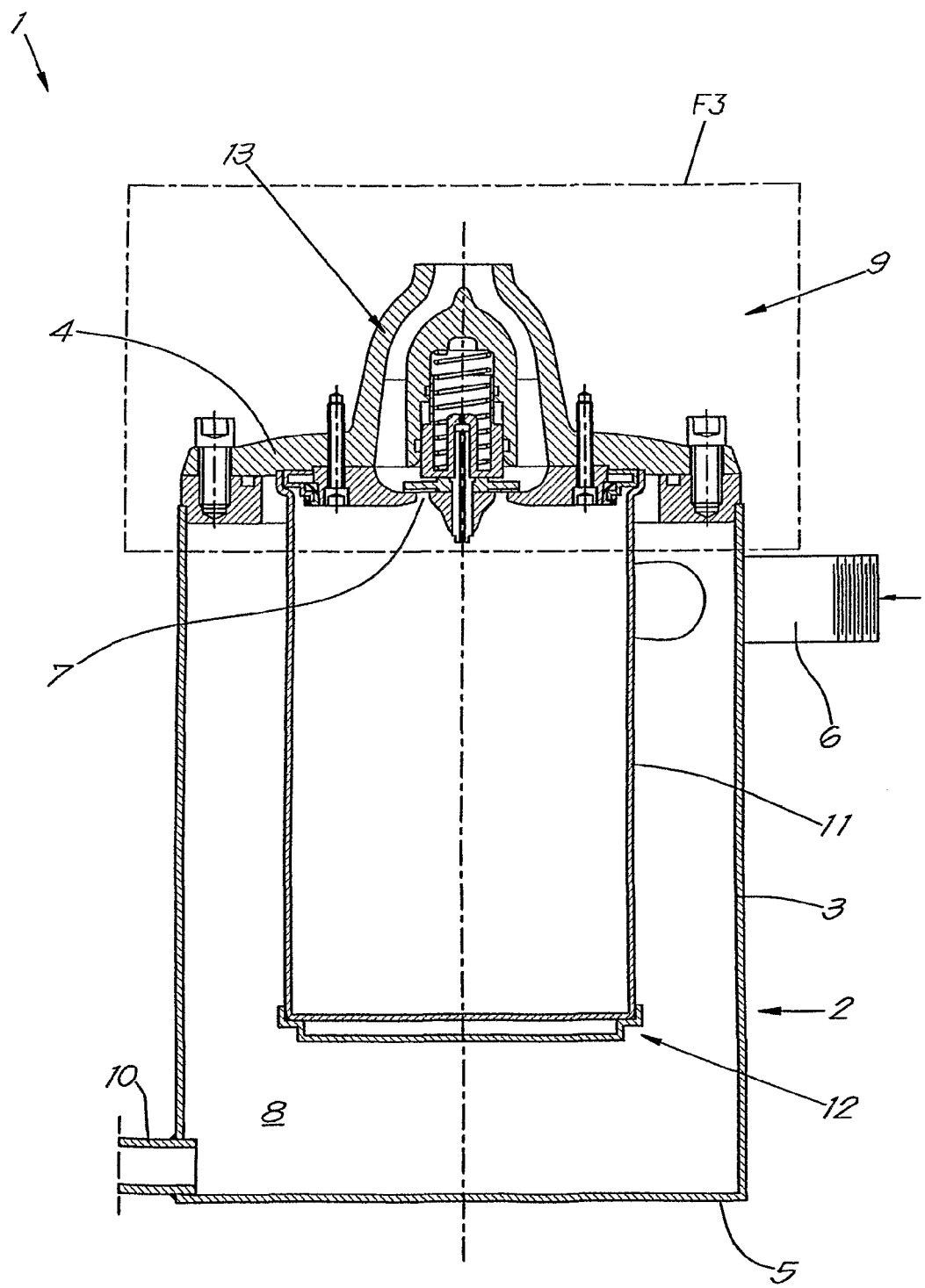
FIG. 2 shows a section according to line II-II in FIG. 1.

The terms "upper wall", "lower wall", "upward" and "downward" are always used here with reference to the accompanying FIGS. 1 to 3, but it goes without saying that the liquid separator 1 must not necessarily be erected entirely vertically, as is shown in the figures, but that it can also be used in other positions.

The present invention is by no means restricted to the embodiments described by way of example and represented in the figures; on the contrary, a minimum pressure valve according to the invention can be made in all sorts of shapes and dimensions while still remaining within the scope of the invention.

The invention claimed is:

1. Minimum pressure valve, comprising:
    a housing with an inlet and an outlet, said inlet and outlet being connected via an inner duct system;
    a movable valve body in the inner duct system being arranged to be pressed against a seating surface around the inlet in a first, closed position, wherein a spring is used to press said movable valve body against said seating surface to close off the inlet and said valve body being arranged to be disposed at a distance from the seating surface in a second, open position, such that the inner duct system connects the inlet to the outlet;
    a valve casing fixed in the inner duct system within the housing, said valve casing comprising a cylindrical housing having an end wall arranged to form a closed end, an open end on an opposite end of the cylindrical housing, and a cylindrical chamber disposed between the closed end and the open end, wherein said cylindrical chamber and movable valve body form a confined, inner space;
    an internal duct extending through the movable valve body to connect the inlet of the housing to the confined, inner space;
    wherein the movable valve body comprises a piston part being arranged to move in a sliding manner within the cylindrical chamber of the valve casing, a sealing element arranged to be pressed against the seating surface in the closed position of the movable valve body, and a valve stem arranged to connect the piston part to the sealing element;
    said piston part being in the shape of a cylindrical bush and comprising a lower wall arranged to substantially seal the cylindrical bush on at least one side apart from said internal duct, wherein said spring extends at least partly within the cylindrical bush to the lower wall;
    said lower wall having a cylindrical fixing wall extending inwardly towards the confined, inner space, said cylindrical fixing wall being arranged to accommodate the valve stem in a partly fixed or movable manner, and
    said internal duct extends through the cylindrical fixing wall of the lower wall, the valve stem, and the sealing element to connect the inlet to the confined, inner space.

2. Minimum pressure valve according to claim 1, wherein the cylinder chamber in the cylinder housing has a reduced diameter over a length thereof, near its closed end, and a larger diameter near its open end; said bush having a stepped outer surface over its length including a first bush part having an outer diameter which corresponds to the reduced diameter of the cylinder chamber and a second bush part having an outer diameter which practically corresponds to the larger diameter of the cylinder chamber; said first bush part extending in the part of the cylinder chamber with the reduced diameter, and the second bush part disposed in the part of the cylinder chamber with the larger diameter.

3. Minimum pressure valve according to claim 2, wherein a wall of the cylinder chamber between the part with the first diameter and the part with the second diameter has a first radial collar, and a second radial collar is provided on the outer perimeter of the bush between the first and second bush part; a space defined by the part of the cylinder housing having the larger diameter and the first bush part, as well as the respective collars of the bush and the wall of the cylinder chamber, said space being under atmospheric pressure.

4. Minimum pressure valve according to claim 1, wherein said piston part of the movable valve body comprises at least a first bush part having a first axially oriented surface directed towards the end wall of the cylindrical housing, and wherein the inlet of the minimum pressure valve has an area which is larger than the first total axially oriented surface of the movable valve body.

5. Minimum pressure valve according to claim 2, wherein the inlet has a diameter which is larger than the reduced diameter of the cylinder chamber.

6. Minimum pressure valve according to claim 1, wherein the valve stem and a fixing device are arranged to connect the sealing element to the bush.

7. Minimum pressure valve according to claim 1, wherein the sealing element is arranged to be movable on the bush by the connection of the sealing element to the valve stem so that the sealing element is arranged as a non-return valve.

8. Minimum pressure valve according to claim 6, wherein the fixing device is in the shape of an aerodynamically shaped nut.

* * * * *